(12) United States Patent
Hashiguchi

(10) Patent No.: US 11,585,782 B2
(45) Date of Patent: *Feb. 21, 2023

(54) CERAMIC APPLIED ELECTRONIC DEVICE AND CONNECTOR

(71) Applicant: JAPAN AVIATION ELECTRONICS INDUSTRY, LIMITED, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

(\*) Notice: Subject to any disclaimer, the term of this patent is extended or adjusted under 35 U.S.C. 154(b) by 167 days.

This patent is subject to a terminal disclaimer.

(21) Appl. No.: 17/010,227

(22) Filed: Sep. 2, 2020

(65) Prior Publication Data
US 2021/0131999 A1 May 6, 2021

(30) Foreign Application Priority Data
Oct. 30, 2019 (JP) .............................. JP2019-197327

(51) Int. Cl.
*G01N 27/406* (2006.01)
*G01N 27/407* (2006.01)
(Continued)

(52) U.S. Cl.
CPC ....... *G01N 27/4062* (2013.01); *G01N 27/407* (2013.01); *H01R 4/70* (2013.01);
(Continued)

(58) Field of Classification Search
CPC ............ G01N 27/4062; G01N 27/407; G01N 27/4071; G01N 27/4073; H01R 4/70;
(Continued)

(56) References Cited

U.S. PATENT DOCUMENTS 6,082,175 A 7/2000 Yoshikawa et al.
7,563,118 B1 7/2009 McCauley et al.
(Continued)

FOREIGN PATENT DOCUMENTS

CN 102317766 1/2012
CN 106662546 5/2017
(Continued)

OTHER PUBLICATIONS

U.S. Appl. No. 16/918,417 to Osamu Hashiguchi, filed Jul. 1, 2020.
(Continued)

*Primary Examiner* — Hae Moon Hyeon
(74) *Attorney, Agent, or Firm* — Greenblum & Bernstein, P.L.C.

(57) ABSTRACT

A connector includes two insulators which hold contacts connected to lead wires and are arranged on two surfaces of a base end portion of a ceramic element, two spring components which have flat plate portions located on respective outer surfaces of the two insulators and spring portions supported by the flat plate portions, and a cylindrical sleeve. Each spring portion has an inclined surface which inclines in a movement direction in which the sleeve moves toward the spring components. Each spring portion is elastically deformed by the sleeve hanging over the spring portion. The two insulators hold the base end portion from two sides by being pushed by the flat plate portions in directions in which the two insulators are brought closer to each other. The contacts are pushed against the terminal electrodes.

14 Claims, 23 Drawing Sheets

(51) Int. Cl.
    *H01R 4/70* (2006.01)
    *H01R 13/24* (2006.01)
    *H01R 12/85* (2011.01)
    *H01R 13/639* (2006.01)

(52) U.S. Cl.
    CPC ......... *H01R 12/85* (2013.01); *H01R 13/2407* (2013.01); *H01R 13/639* (2013.01); *H01R 2201/20* (2013.01)

(58) Field of Classification Search
    CPC .... H01R 13/2407; H01R 12/85; H01R 13/26; H01R 13/10; H01R 13/502; H01R 13/639; H01R 2201/20
    See application file for complete search history.

(56) References Cited

U.S. PATENT DOCUMENTS

| | | | | |
|---|---|---|---|---|
| 7,798,855 B2* | 9/2010 | Gustin | ............... | H01R 13/6683 439/620.21 |
| 8,191,414 B2* | 6/2012 | Kume | ............... | G01N 27/4062 73/23.31 |
| 8,721,190 B2 | 5/2014 | Koreeda et al. | | |
| 9,003,867 B2* | 4/2015 | Kitoh | ............... | G01N 27/4062 73/31.05 |
| 10,514,356 B2* | 12/2019 | Hino | ............... | G01N 27/4077 |
| 2001/0025522 A1 | 10/2001 | Kojima | | |
| 2009/0318014 A1 | 12/2009 | McCauley et al. | | |
| 2012/0031171 A1 | 2/2012 | Masuda et al. | | |
| 2012/0071042 A1 | 3/2012 | Masuda et al. | | |
| 2012/0192653 A1 | 8/2012 | Masuda et al. | | |
| 2012/0216599 A1 | 8/2012 | Kitoh | | |
| 2017/0284957 A1 | 10/2017 | Noda et al. | | |
| 2019/0004007 A1* | 1/2019 | Oba | ............... | G01N 27/4062 |
| 2019/0178835 A1 | 6/2019 | Hino | | |
| 2020/0287306 A1 | 9/2020 | Hashiguchi | | |
| 2021/0131997 A1* | 5/2021 | Hashiguchi | ............ | G01N 27/407 |

FOREIGN PATENT DOCUMENTS

| | | |
|---|---|---|
| CN | 109564183 | 4/2019 |
| JP | H10-253579 A | 9/1998 |
| JP | 2002-168825 | 6/2002 |
| JP | 2005-077122 | 3/2005 |
| JP | 2011-133351 | 7/2011 |
| WO | 2015/115660 | 8/2016 |

OTHER PUBLICATIONS

U.S. Appl. No. 16/988,798 to Osamu Hashiguchi, filed Aug. 10, 2020.

Extended European Search Report issued in European Patent Office (EPO) Counterpart Patent Appl. No. 20198203.0, dated Mar. 9, 2021.

Office Action issued in China Patent Application No. 202011022816.6, dated Nov. 24, 2022, together with English translation thereof.

* cited by examiner

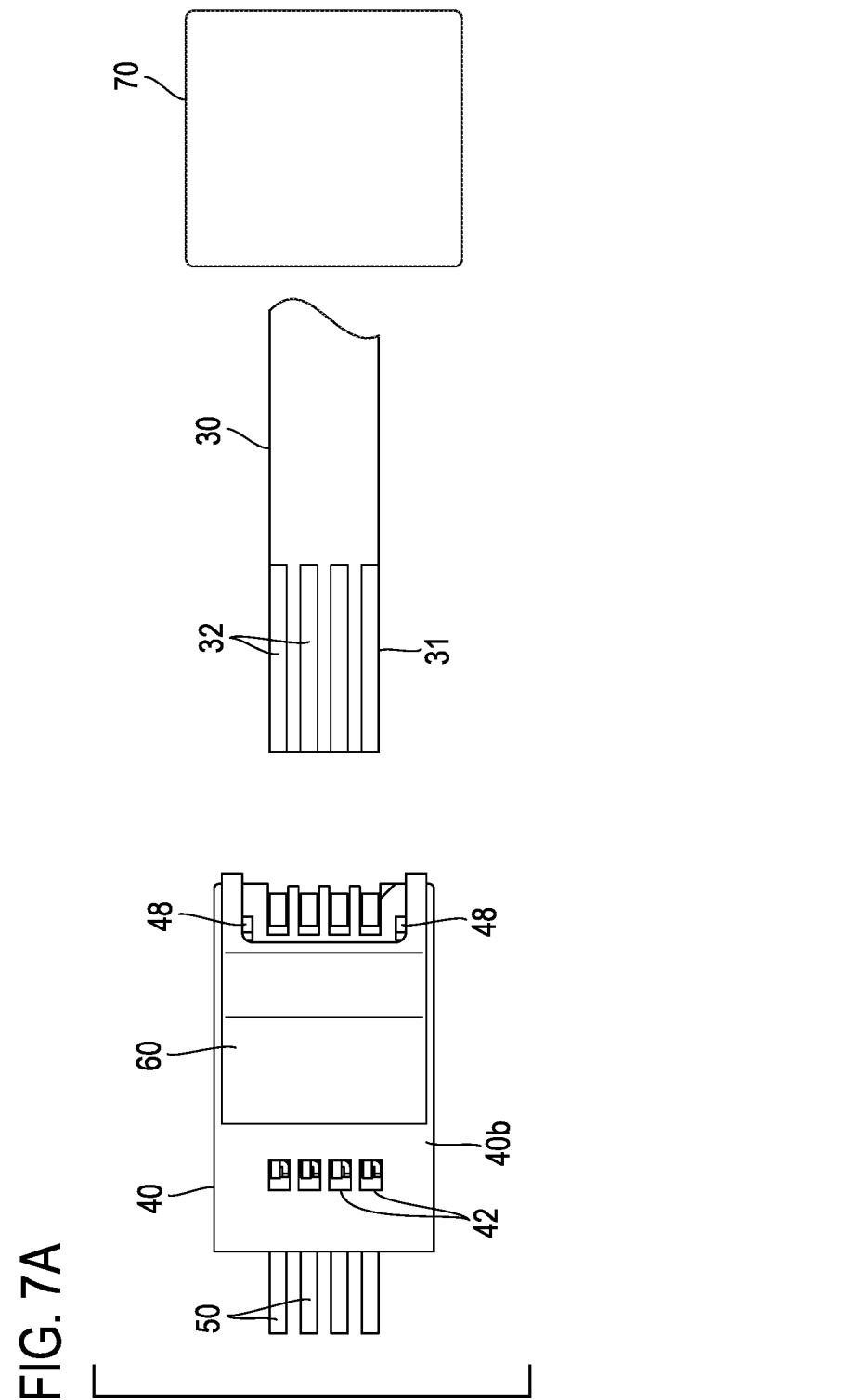

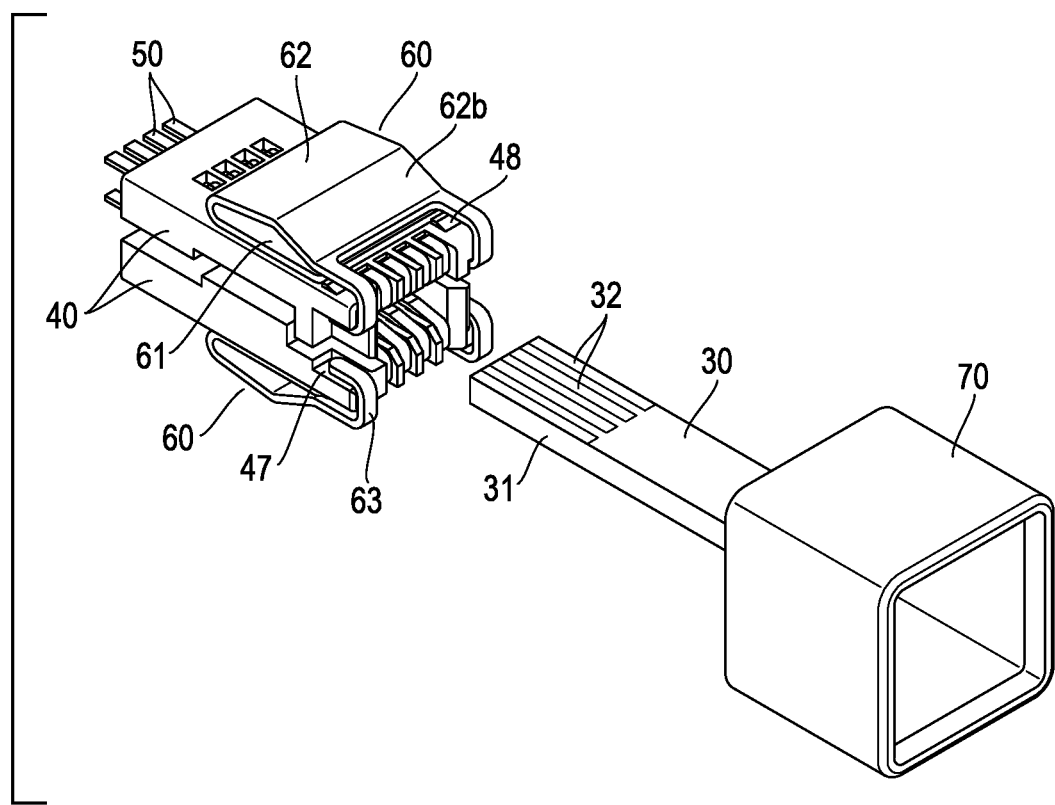

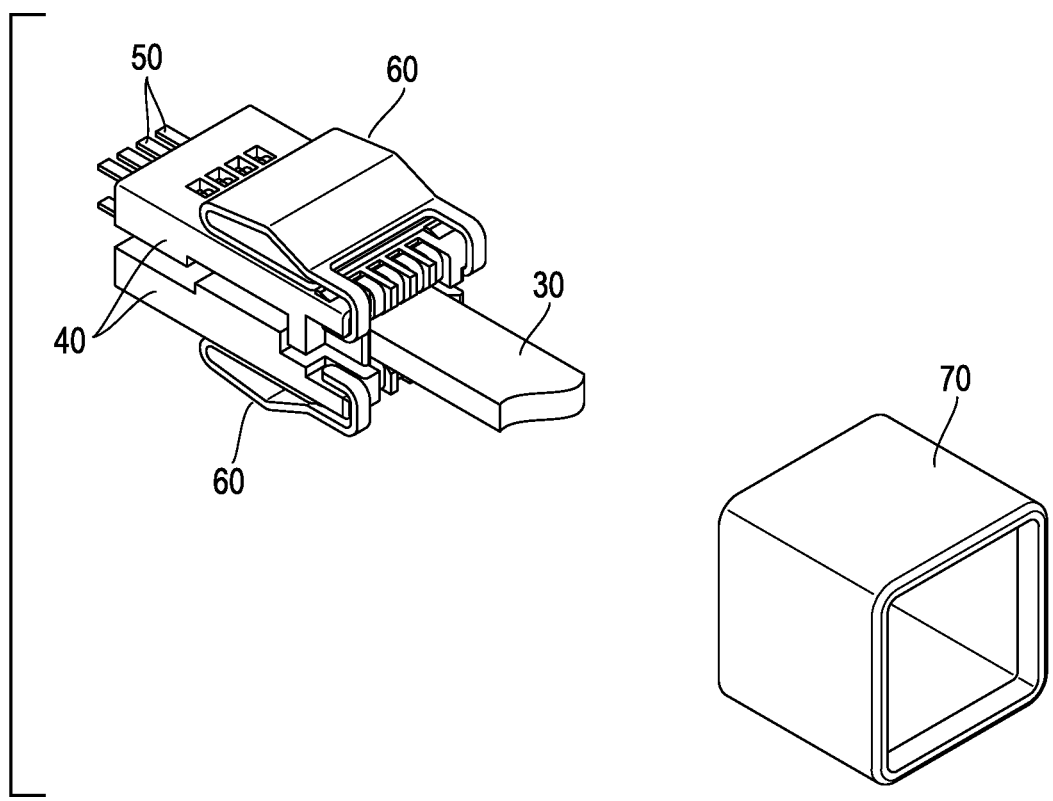

CERAMIC APPLIED ELECTRONIC DEVICE AND CONNECTOR

TECHNICAL FIELD

This invention relates to a ceramic applied electronic device, such as a nitrogen oxides ($NO_x$) sensor or an oxygen sensor incorporating a ceramic element, and also relates to a connector used in the ceramic applied electronic device.

BACKGROUND ART

FIG. 1 illustrates an oxygen sensor for detecting the concentration of oxygen in exhaust gas from a vehicle, which is disclosed as a prior art associated with a ceramic applied electronic device in Japanese Patent Application Laid Open No. H10-253579. FIG. 2 illustrates an assembly in a portion A in FIG. 1.

The oxygen sensor includes a ceramic element 11, and the ceramic element 11 is fixed in a main metal shell 12 by, for example, a glass seal 13. A cover 15 which covers a projecting portion of the ceramic element 11 is attached to an outer perimeter of a distal end of the main metal shell 12. Openings 15a which guide exhaust gas flowing through an exhaust pipe into the cover 15 are formed in the cover 15.

The ceramic element 11 has an elongated shape and is square in sectional shape. Two electrode terminal portions 16 are formed on each of one outer surface and the other outer surface of one end portion of the ceramic element 11 (see FIG. 2). A conducting wire (specifically an elongated thin metal plate) 17 is connected to each electrode terminal portion 16. Each conducting wire 17 is connected to a lead wire 19 via a connector portion 18. Four lead wires 19 extend through a grommet 21 and extend further to outside the grommet 21. Distal end portions of the four lead wires 19 are coupled to a connector plug 22. Reference numeral 14 in FIG. 1 denotes a cylindrical metal casing, and reference numeral 23 denotes a protective tube which protects the lead wires 19.

A coupling unit 25 which is composed of the ceramic element 11, the conducting wires 17, and insulating plates 24 is constructed by placing one conducting wire 17 on each electrode terminal portion 16 and placing the insulating plates 24 on the conducting wires 17. The electrode terminal portions 16 and the conducting wires 17 are connected to each other by tightening the coupling unit 25 with a metal ring 26 such that the coupling unit 25 fits tightly, as illustrated in FIG. 2.

That is, the coupling unit 25 is tightened up by the metal ring 26, and each conducting wire 17 is pressed onto the electrode terminal portion 16 of the ceramic element 11. As a result, the electrode terminal portion 16 and the conducting wire 17 are electrically connected to each other.

With the above-described connection structure, contact forces differ due to variation in dimensions among the ceramic elements 11 or the insulating plates 24 that are components of the coupling units 25, and a stable contact force may not be obtained between the conducting wire 17 and the electrode terminal portion 16.

Additionally, since the coupling unit 25 is composed of high-rigidity members, a large force is needed in the process of press-fitting into the metal ring 26, and assembly work is difficult.

BRIEF SUMMARY OF THE INVENTION

An object of this invention is to provide a connector capable of being electrically connected to a ceramic element of a ceramic applied electronic device with good reliability and workability and a ceramic applied electronic device including the connector.

The following technical matters are described simply to facilitate the understanding of the main points of the present invention, not to limit the invention claimed in the claims explicitly or implicitly and not to express the possibility of accepting such a limitation that is imposed by a person other than those who will benefit from the present invention (for example, the applicant and the right holder). The general outline of the present invention described from other perspectives can be understood from, for example, the claims of this application as originally filed at the time of application.

A connector according to the present invention includes two insulators, two spring components, and a cylindrical sleeve. The two spring components are mounted on the two insulators for holding a ceramic element from two sides. A spring portion of each of the two spring components has an inclined surface which inclines in a movement direction in which the cylindrical sleeve moves toward the two spring components. The spring portion is elastically deformed when the cylindrical sleeve hangs over the spring portion. The two elastically deformed spring components push the two insulators so as to bring the two insulators closer to each other, and the two insulators tightly hold the ceramic element from the two sides. In this state, contacts mounted on each of the two insulators are pushed hard against terminal electrodes of the ceramic element.

A ceramic applied electronic device according to the present invention includes the above-described connector.

These and other objects, features and advantages of the present invention will become apparent from the detailed description taken in conjunction with the accompanying drawings.

Effects of the Invention

A connector according to this invention can be electrically connected to a ceramic element of a ceramic applied electronic device with good reliability and workability.

BRIEF DESCRIPTION OF THE DRAWINGS

The subject matter, which is regarded as the invention, is particularly pointed out and distinctly claimed in the claims at the conclusion of the specification. The present invention itself, and manner in which it may be made or used, if any, may be better understood after a review of the following description in connection with the accompanying drawings in which:

FIG. 7A is a plan view of the connector according to the first embodiment, to which the ceramic element is not connected;

FIG. 8 is a perspective view of the connector according to the first embodiment, to which the ceramic element is not connected;

FIG. 9 is a perspective view illustrating the connector according to the first embodiment, to which a sleeve is not attached;

LIST OF REFERENCE NUMERALS

Figure 1:
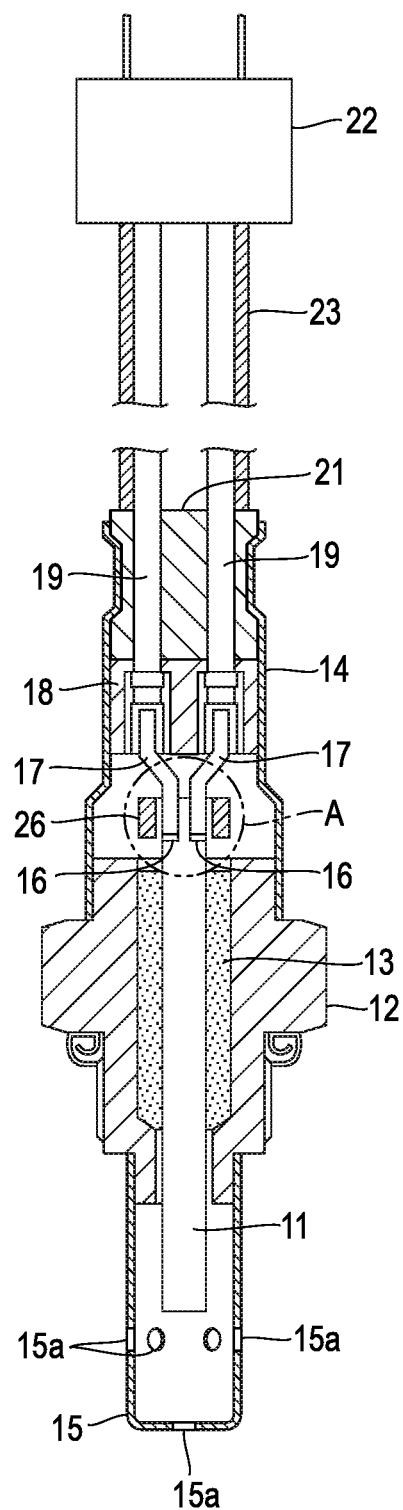
FIG. 1 is a sectional view of a ceramic applied electronic device according to a conventional technique.
Figure 2:
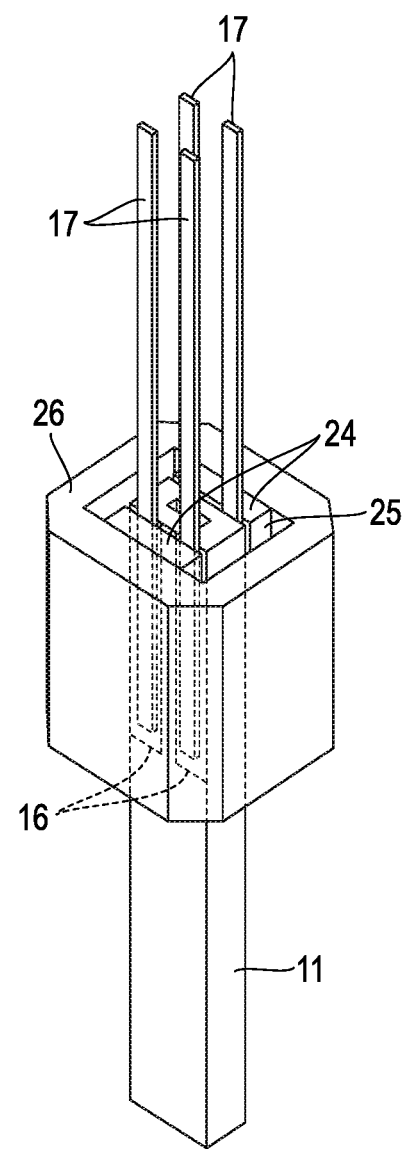
FIG. 2 is a perspective view illustrating details of a portion A in FIG. 1.
Figure 3A:
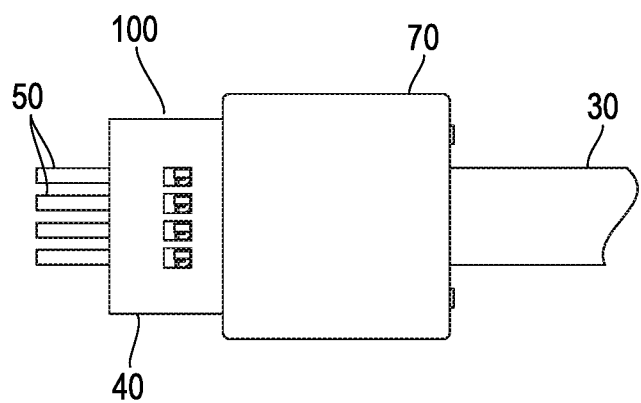
FIG. 3A is a plan view of a connector according to a first embodiment, to which a ceramic element is connected.
Figure 3B:
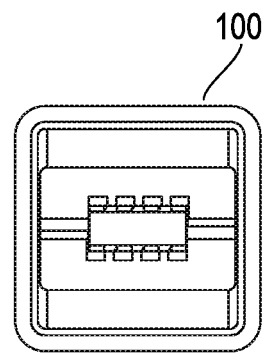
FIG. 3B is a left side view of the connector according to the first embodiment, to which the ceramic element is connected.
Figure 3C:
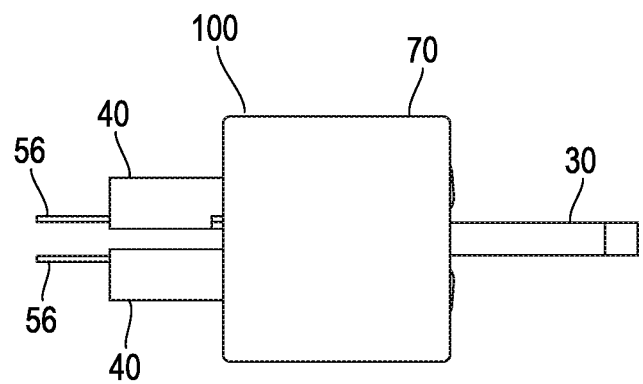
FIG. 3C is a front view of the connector according to the first embodiment, to which the ceramic element is connected.
Figure 3D:
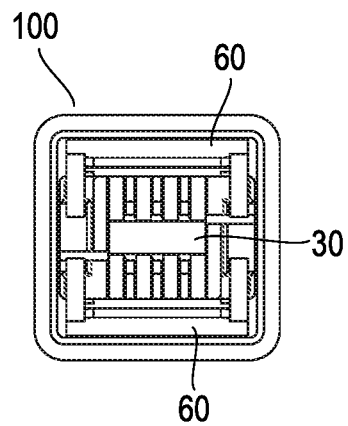
FIG. 3D is a right side view of the connector according to the first embodiment, to which the ceramic element is connected.

With regard to reference numerals used, the following numbering is used throughout the drawings.

11: ceramic element
12: main metal shell
13: glass seal
14: cylindrical metal casing
15: cover
15a: opening
16: electrode terminal portion
17: conducting wire
18: connector portion
19: lead wire
21: grommet
22: connector plug
23: protective tube
24: insulating plate
25: coupling unit
26: metal ring
30: ceramic element
31: base end portion
32: terminal electrode
40: insulator
40': insulator
40": insulator
40a: lower surface
40b: upper surface
40c: side surface
40d: side surface
40e: recessed portion
41: groove
42: hole
43: stopping portion
44: projecting portion
45: regulation portion
46: regulation portion
47: recessed portion
48: projection
49: recessed portion
49a: claw portion
50: contact
51: distal end portion
52: contact portion
53: contact portion
54: rising portion
55: hook portion
56: connection portion
60: spring component
60': spring component
60": spring component
61: flat plate portion
62: turnback piece
62a: bent portion
62b: inclined surface
63: hook portion
64: turnback piece
64a: distal end
64b: inclined surface
65: mounting piece
66: window 67: turnback piece
67a: distal end
68: projecting portion
69: notch
70: sleeve
70': sleeve
75: metal fitting
76: fixing piece
77: opening
80: protective cover
81: inner protective cover
81a: hole
82: outer protective cover
82a: hole
90: sensor assembly
91: main metal shell
91a: threaded portion
92: internal cylinder
93: external cylinder
94a: ceramic supporter
94b: ceramic supporter
94c: ceramic supporter
95a: ceramic powder
95b: ceramic powder
96: lead wire
97: rubber plug
100: connector
200: connector
300: connector

DETAILED DESCRIPTION

Embodiments of this invention will be described with reference to the drawings.

First Embodiment

FIGS. 3A, 3B, 3C, 3D, 4A, and 4B illustrate a configuration of a connector according to a first embodiment. A connector 100 is used to connect a ceramic element incorporated in a ceramic applied electronic device and lead wires for connection with an external apparatus. FIGS. 3A, 3B, 3C, 3D, 4A, and 4B illustrate the connector 100, to which a ceramic element 30 is connected.

Figure 5:
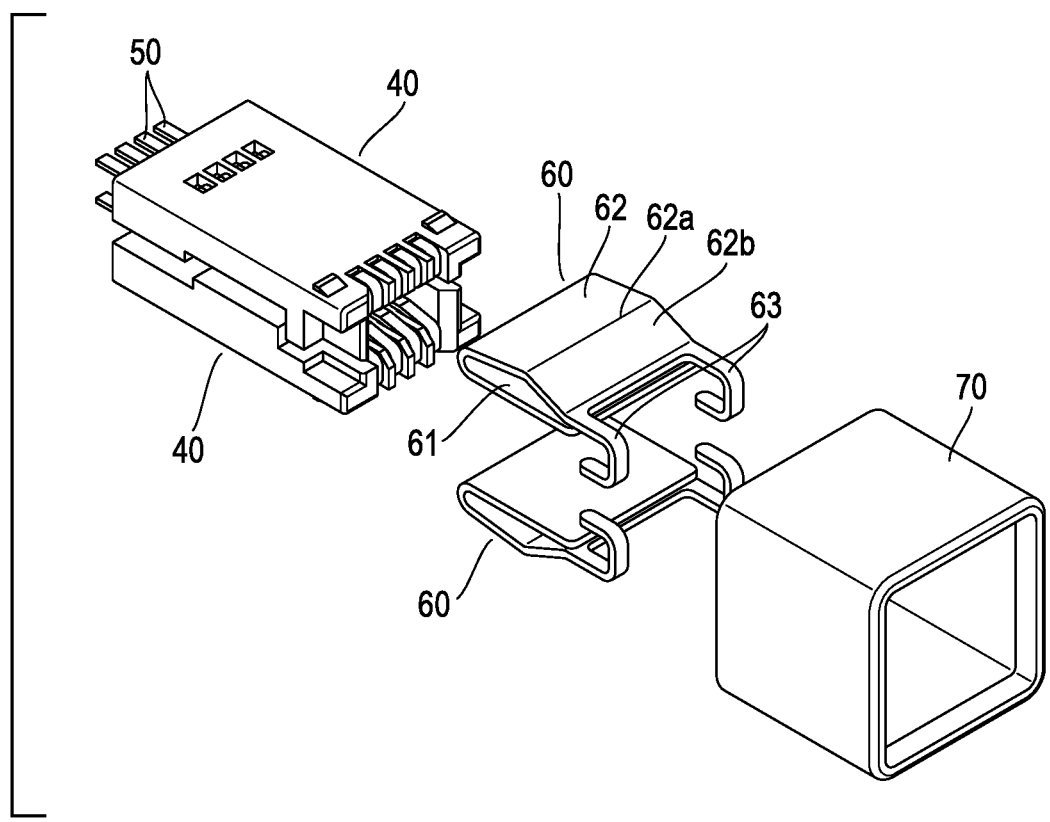
FIG. 5 is a perspective view of the connector according to the first embodiment, which is partially exploded.
Figure 6A:
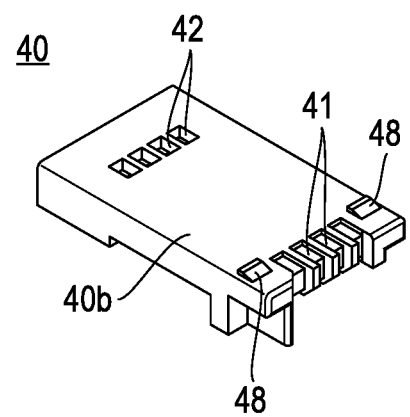
FIG. 6A is a perspective view of an insulator illustrated in FIG. 5.
Figure 6B:
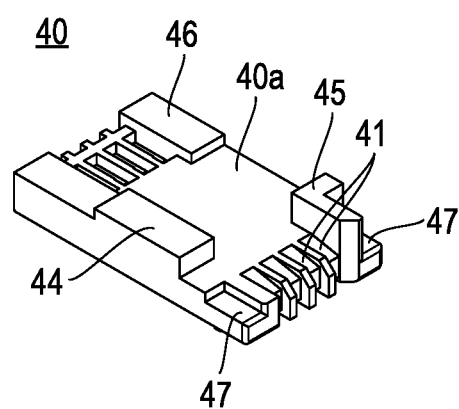
FIG. 6B is an upside-down perspective view of the insulator illustrated in FIG. 6A.
Figure 7B:
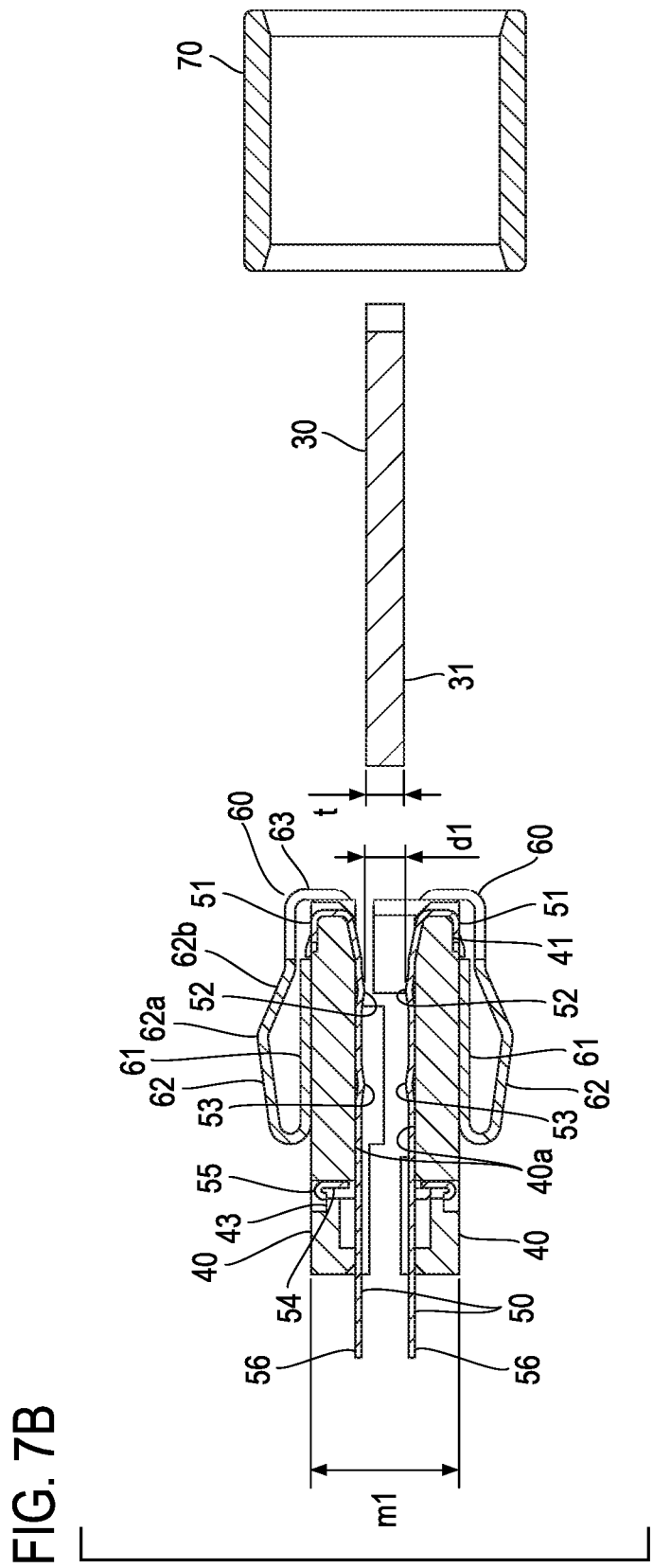
FIG. 7B is a sectional view of the connector according to the first embodiment, to which the ceramic element is not connected.

The connector 100 includes two insulators 40, eight contacts 50, two spring components 60, and a cylindrical sleeve 70 which is hollow and rectangular in sectional shape. FIG. 5 is a partial exploded view of the connector 100, and FIGS. 6A and 6B illustrate details of the insulator 40. FIGS. 7A, 7B, and 8 illustrate the connector 100, to which the ceramic element 30 is not connected.

The two insulators 40 each hold four contacts 50 aligned at a lower surface 40a. The two insulators 40 are arranged such that the lower surface 40a of one of the two insulators 40 and the lower surface 40a of the other face each other. Four grooves 41, four holes 42 and stopping portions 43 (see FIG. 7B) are formed at the insulator 40, as illustrated in FIGS. 6A and 6B, the four grooves 41 housing distal ends of the contacts 50 which catch on the four grooves 41, the four holes 42 receiving insertion of parts of the contacts 50, and the stopping portions 43 stopping the contacts 50. Each stopping portion 43 is located in the hole 42.

A projecting portion 44 is formed at one end in a width direction (that is, an array direction of the grooves 41) of the lower surface 40a of the insulator 40, and regulation portions 45 and 46 project at the other end. The projecting portion 44 and the regulation portions 45 and 46 serve as spacers. In a state in which the two insulators 40 are arranged with the one lower surface 40a and the other lower surface 40a facing each other, the projecting portion 44 of the one insulator 40 is located between the regulation portions 45 and 46 of the other insulator 40, and the projecting portion 44 of the other insulator 40 is located between the regulation portions 45 and 46 of the one insulator 40.

At the lower surface 40a of the insulator 40, a recessed portions 47 is formed at each of two corners in the width direction of one end having the grooves 41. Two projections 48 are formed at an upper surface 40b of the insulator 40, and positions of the two projections 48 substantially correspond to positions of the recessed portions 47 of the lower surface 40a.

The insulator 40 is made of ceramic, such as an alumina sintered body.

Each contact 50 is held by the insulator 40, as illustrated in FIGS. 5, 7A, and 7B. The contact 50 includes a distal end portion 51 in a curved shape, contact portions 52 and 53 which are slightly bent, a rising portion 54 which is to be inserted into the hole 42 of the insulator 40, a hook portion 55 which is formed at a distal end of the rising portion 54, and a connection portion 56 which extends straight. The distal end portion 51 is housed in the groove 41 of the insulator 40 by being hooked around the groove 41 of the insulator 40. The contact portions 52 and 53 are electric contacts which are to come into contact with a terminal electrode of the ceramic element 30. The hook portion 55 is hooked on the stopping portion 43 of the insulator 40. The connection portion 56 is led out from the insulator 40.

The spring component 60 made of metal is a plate portion which is turned back by approximately 180 degrees, as illustrated in FIGS. 5, 7A, and 7B, and has a square flat plate portion 61, a turnback piece 62 which is continuous with one end of the flat plate portion 61 and extends from the one end of the flat plate portion 61 toward the other end of the flat plate portion 61, and two hook portions 63 which project from two end portions in the width direction of a distal end of the turnback piece 62. The hook portions 63 are bent in a staple shape.

The turnback piece 62 functions as a spring portion (spring piece), and a bent portion 62a is formed in the middle in an extension direction of the turnback piece 62. The turnback piece 62 has a V-shape in which the bent portion 62a is farther from the flat plate portion 61. An inclined surface 62b which gradually becomes farther from the flat plate portion 61 in a direction from the hook portions 63 toward the bent portion 62a is formed between the bent portion 62a and the hook portions 63.

The spring component 60 is formed of, for example, a stainless material, and the cylindrical sleeve 70 is also formed of a stainless material.

The spring component 60 is mounted on each of the two insulators 40 holding the contacts 50. In a state in which the spring components 60 are mounted on the two insulators 40, each flat plate portion 61 is located on the upper surface 40b of the insulator 40, and distal ends of the two hook portions 63 are located in the recessed portions 47 of the lower surface 40a of the insulator 40 to hook the two hook portions 63 on the insulator 40. The flat plate portion 61 butts against the two projections 48, which prevents the spring component 60 from coming off from the insulator 40.

The two insulators 40 with the spring components 60 mounted on the upper surfaces 40b, that is, outer surfaces are arranged such that the lower surfaces 40a face each other, as illustrated in FIGS. 7A, 7B, and 8. The two insulators 40 are positioned by a jig (not illustrated), and a spacing between the contact portions 52 (53) of the contacts 50 facing each other is indicated by d1 (see FIG. 7B).

A base end portion 31 of the ceramic element 30, which is to be connected to lead wires for connection with an external apparatus by the connector 100, is inserted between the two insulators 40 in the state illustrated in FIGS. 7A, 7B, and 8. Four terminal electrodes 32 are arrayed on a surface on the obverse side of the base end portion 31, as illustrated in FIGS. 7A and 8, and four terminal electrodes 32 are also arrayed on a surface on the reverse side. The terminal electrodes 32 are not illustrated in detail in FIGS. 7B, 3B, and 4B.

Before insertion of the base end portion 31 between the two insulators 40, the ceramic element 30 is passed through the sleeve 70. The base end portion 31 of the ceramic element 30 after the passage through the sleeve 70 is inserted between the two insulators 40 (see FIG. 9). After the insertion, the sleeve 70 is moved, that is, slid to a position illustrated in FIGS. 3A and 4B, thereby completing connection of the connector 100 and the ceramic element 30. When the sleeve 70 is positioned at the position illustrated in FIGS. 3A and 4B, the positioning jig described above is released from the two insulators 40.

Letting t be a thickness of the ceramic element 30, as illustrated in FIG. 7B, the spacing d1 between the contact portions 52 of the contacts 50 facing each other and the thickness t satisfy d1≥t. The same applies to the spacing d1 between the contact portions 53 of the contacts 50 facing each other.

Thus, the ceramic element 30 can be inserted between the two insulators 40 without the need for an insertion force. That is, the ceramic element 30 can be inserted with a zero insertion force (ZIF). d1 may be set slightly smaller than t. In this case, the ceramic element 30 can be inserted with a slight insertion force. That is, the ceramic element 30 can be inserted with a low insertion force (LIF).

The inclined surface 62b has a slope descending gently toward the sleeve 70 that travels toward the spring component 60 and does not interfere with movement of the sleeve 70. Additionally, with a force received from the sleeve 70, the inclined surface 62b inclines toward the insulator 40.

In a state in which connection of the connector 100 and the ceramic element 30 is completed, the sleeve 70 hangs over the turnback pieces 62 of the two spring components 60, and elastically deforms the two turnback pieces 62 in a direction in which the bent portions 62a are brought closer to each other by pushing the bent portions 62a. As a result, the two insulators 40 located on the two surfaces of the base end portion 31 of the ceramic element 30 are pushed by the flat plate portions 61 of the two spring components 60 to tightly hold the base end portion 31 from two sides. That is, the two insulators 40 firmly hold the ceramic element 30. Additionally, the contact portions 52 and 53 of each contact 50 held by the insulator 40 are pushed against the terminal electrode 32 formed on the base end portion 31, which results in mutual electrical connection between the contact 50 and the terminal electrode 32.

Figure 4A:
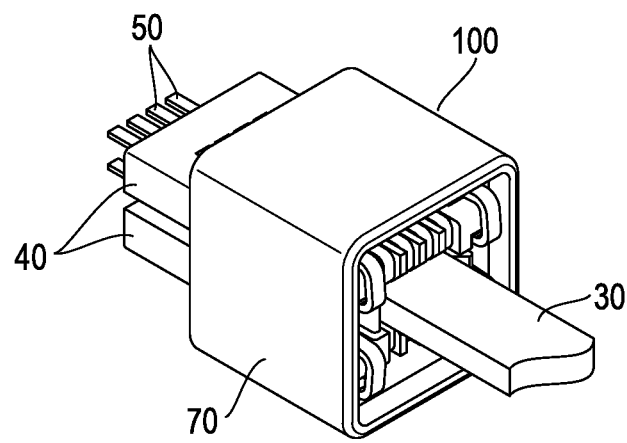
FIG. 4A is a perspective view of the connector according to the first embodiment, to which the ceramic element is connected.
Figure 4B:
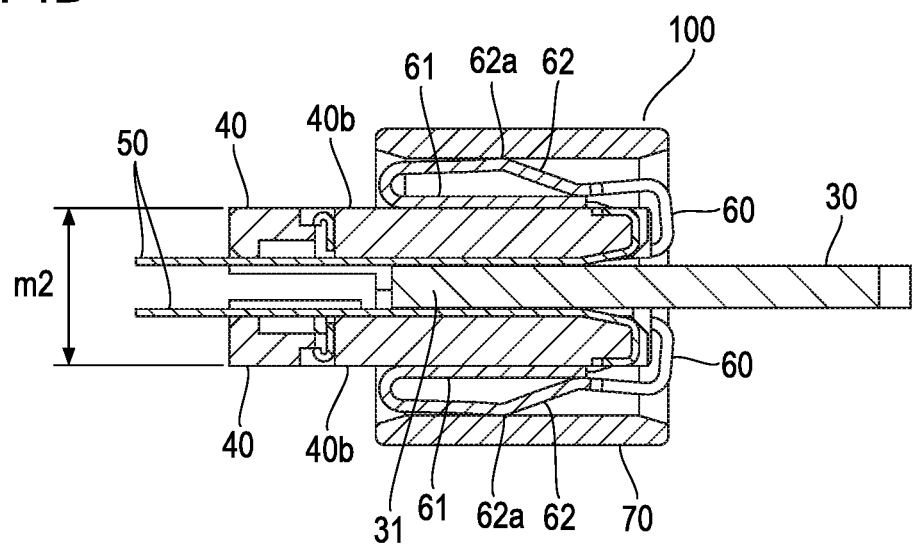
FIG. 4B is an enlarged sectional view of the connector according to the first embodiment, to which the ceramic element is connected.

As for the flat plate portion 61 of the spring component 60 parallel to the upper surface 40b of the insulator 40, when the turnback piece 62 is elastically deformed, the other end of the flat plate portion 61 is pressed by the distal end of the turnback piece 62, as illustrated in FIG. 4B. Accordingly, the whole of the flat plate portion 61 comes into good contact with the upper surface 40b of the insulator 40. The flat plate portion 61 is thus capable of pushing the insulator 40 in a balanced manner. As described above, the turnback piece 62 is made to function as a spring, which increases a contact force between the spring component 60 and the insulator 40.

As has been described above, the turnback pieces 62 of the two spring components 60 are structured to hold the two insulators 40 and the base end portion 31 of the ceramic element 30 from two sides when elastically deformed. Thus, even if there is variation in dimensions among the insulators 40 or the ceramic elements 30, the structure accommodates the variation in dimensions, and a stable contact force is obtained. That is, the connector 100 is excellent in connection reliability between the connector 100 and the ceramic element 30 and is excellent in connection operability and can be connected to the ceramic element 30 with a small operational force.

Since the insulator 40 is pushed by a large surface of the flat plate portion 61 of the spring component 60, the insulator 40 made of ceramic is in no danger of breaking by a local force.

Letting m1 be a dimension between the upper surfaces 40b of the two insulators 40 in the state shown in FIG. 7B, and m2 be a dimension between the upper surfaces 40b of the two insulators 40 in the state shown in FIG. 4B, m2<m1 holds.

The lead wires for connection with an external apparatus are connected to the connection portions 56 of the contacts 50 of the connector 100, and the terminal electrodes 32 of the ceramic element 30 and the lead wires are electrically connected to each other by the connector 100.

A ceramic applied electronic device which includes the above-described connector 100 will next be described.

Figure 10:
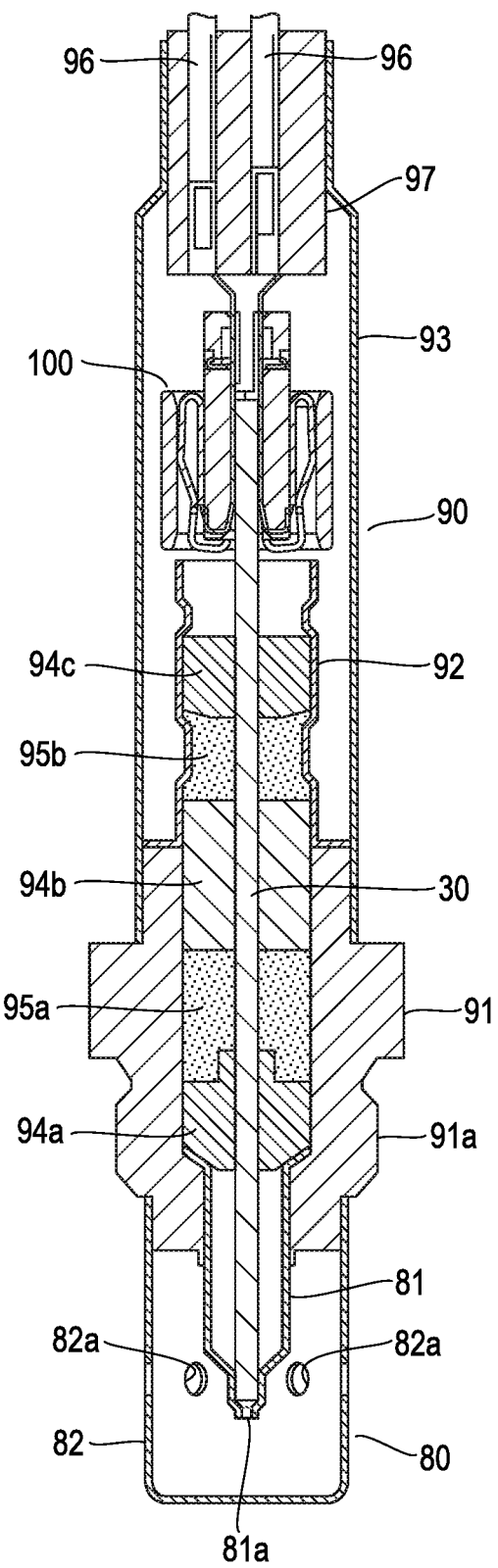
FIG. 10 is a sectional view illustrating a ceramic applied electronic device according to the embodiment.

FIG. 10 illustrates a gas sensor which is a ceramic applied electronic device according to the embodiment. The gas sensor includes the ceramic element 30 that detects a predetermined gas component from gas to be detected, a protective cover 80 which protects a distal end portion of the ceramic element 30, and a sensor assembly 90 which includes the connector 100 connected to the ceramic element 30.

The ceramic element 30 has an elongated plate-like shape and has, for example, a structure in which six ceramic substrates composed of oxygen-ion-conducting solid electrolyte layers made of yttria-stabilized zirconia are stacked.

The protective cover 80 includes an inner protective cover 81 which covers a distal end of the ceramic element 30 and an outer protective cover 82 which covers the inner protective cover 81. The inner protective cover 81 has a hole 81a for introduction of the gas to be detected at the distal end of the ceramic element 30, and the outer protective cover 82 has holes 82a for introduction of the gas to be detected at a side surface.

The sensor assembly 90 includes a main metal shell 91, an internal cylinder 92 and an external cylinder 93 which are fixed to the main metal shell 91 through welding, and the connector 100 that is connected to the base end portion 31 of the ceramic element 30. Referring to FIG. 10, although not illustrated in detail, reference character 91a denotes a threaded portion for mounting which is formed at the main metal shell 91.

Ceramic supporters 94a to 94c and ceramic powders 95a and 95b, with which a space between the ceramic supporters 94a and 94b and a space between the ceramic supporters 94b and 94c are filled, are enclosed in the internal cylinder 92. The external cylinder 93 surrounds the internal cylinder 92, a part of the ceramic element 30, and the connector 100. Lead wires 96 which are connected to the contacts 50 of the connector 100 are led out from the sensor assembly 90. The lead wires 96 are electrically connected to the terminal electrodes 32 of the ceramic element 30 via the connector 100. A gap between the external cylinder 93 and the lead wires 96 is sealed with a rubber plug 97.

The above-described gas sensor is mounted on, for example, an exhaust gas pipe of a vehicle and is used to detect a gas component (for example, $NO_x$ or $O_2$) contained in exhaust gas. Since the connector 100 is used to connect the ceramic element 30 and the lead wires 96, high-reliability electrical connection of the ceramic element 30 and the lead wires 96 is implemented. Additionally, mounting of the connector 100 on the ceramic element 30 is easy (good workability).

Second Embodiment

A configuration of a connector according to a second embodiment for connection of terminal electrodes of a ceramic element and lead wires will be described.

Figure 11A:
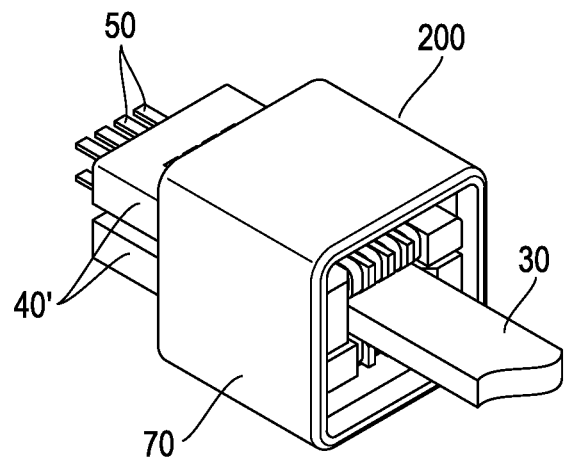
FIG. 11A is a perspective view of a connector according to a second embodiment, to which a ceramic element is connected.
Figure 11B:
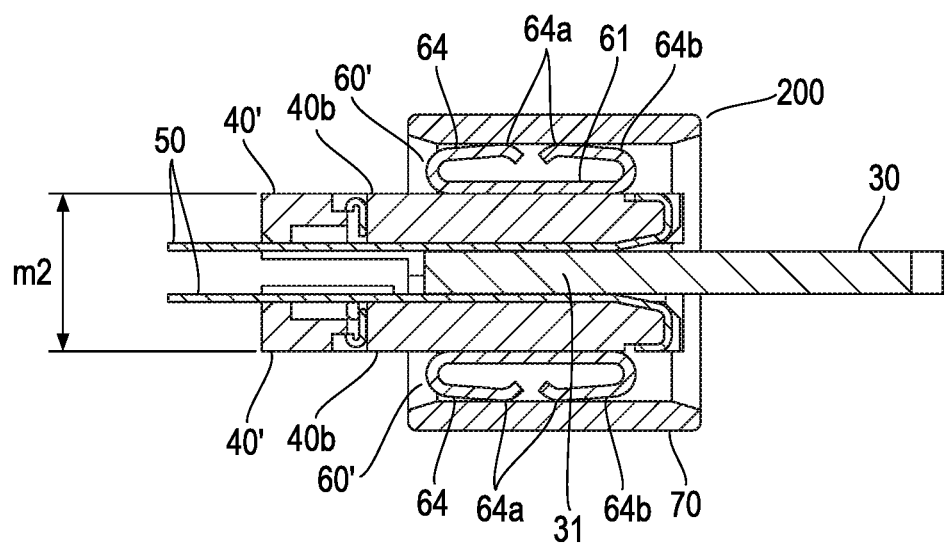
FIG. 11B is an enlarged sectional view of the connector according to the second embodiment, to which the ceramic element is connected.
Figure 12:
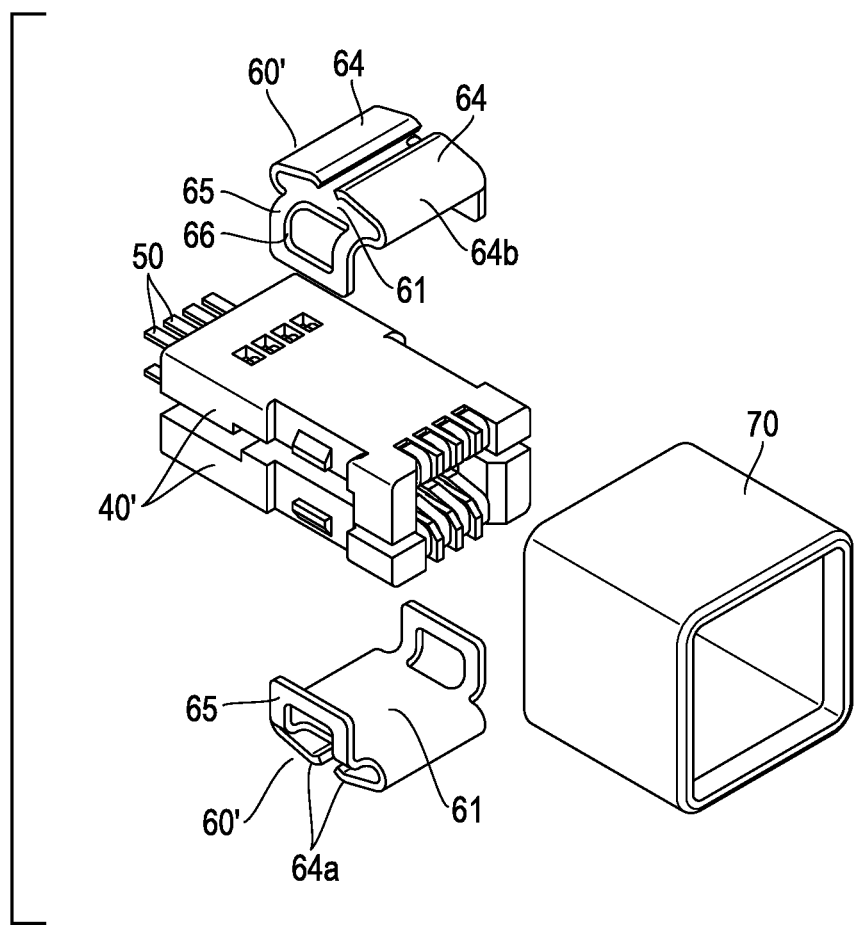
FIG. 12 is a perspective view of the connector according to the second embodiment, which is partially exploded.
Figure 13A:
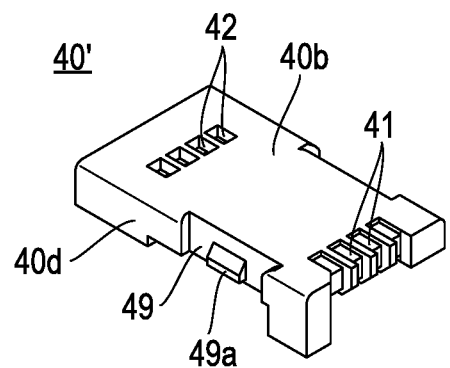
FIG. 13A is a perspective view of an insulator illustrated in FIG. 12.
Figure 13B:
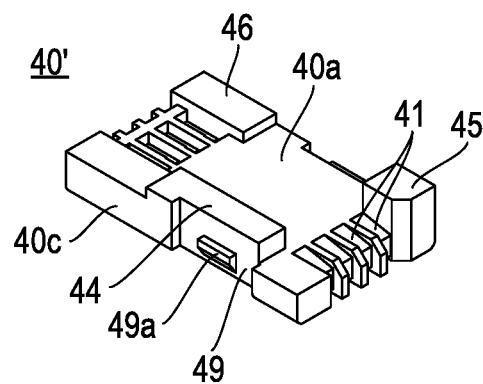
FIG. 13B is an upside-down perspective view of the insulator illustrated in FIG. 13A.
Figure 14A:
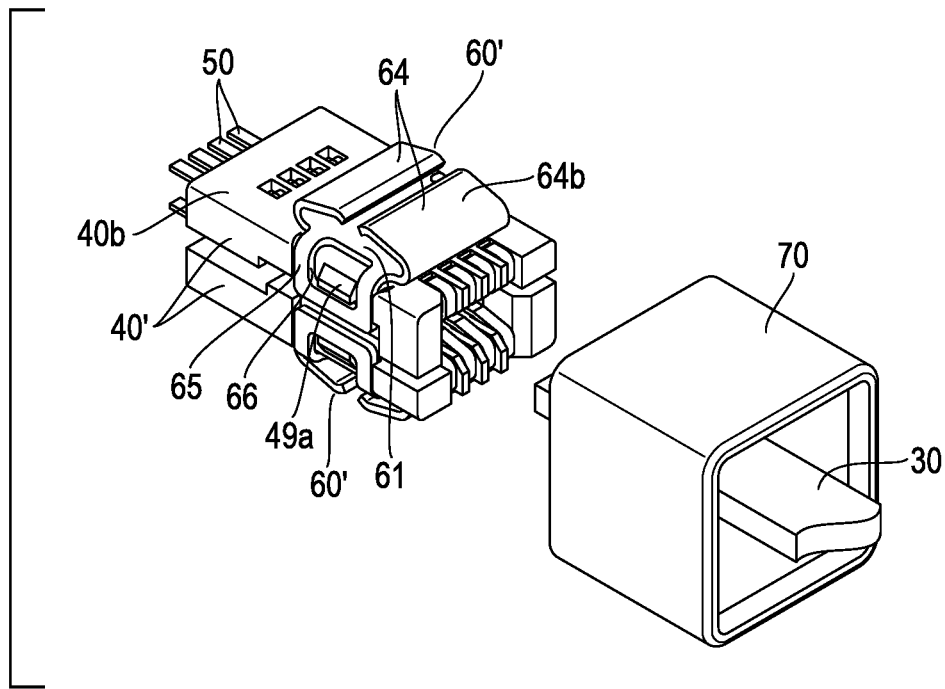
FIG. 14A is a perspective view of the connector according to the second embodiment, to which the ceramic element is not connected.
Figure 14B:
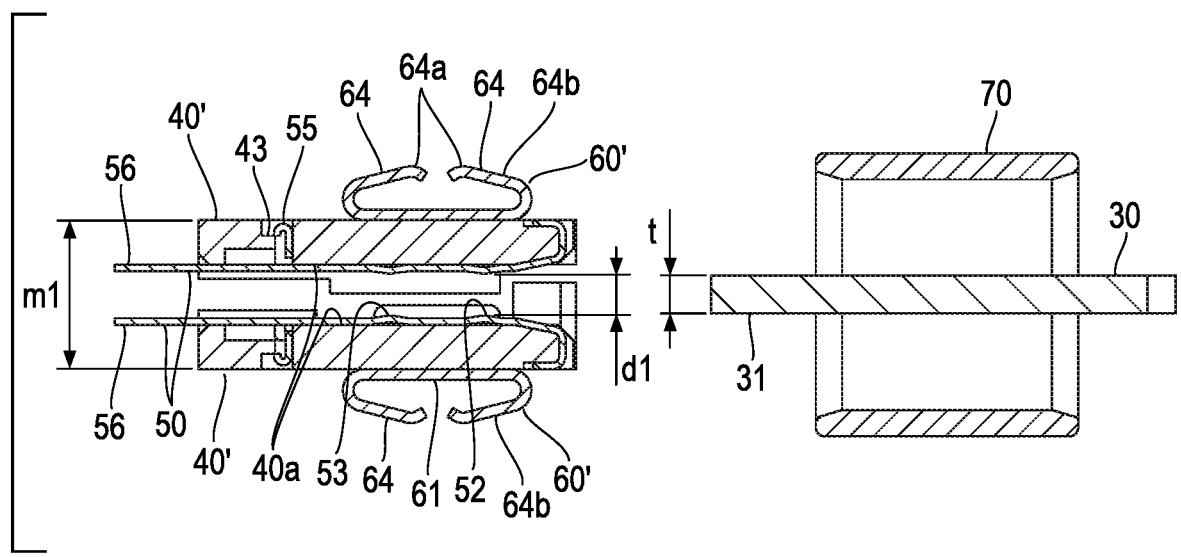
FIG. 14B is an enlarged sectional view of the connector according to the second embodiment, to which the ceramic element is not connected.
Figure 15A:
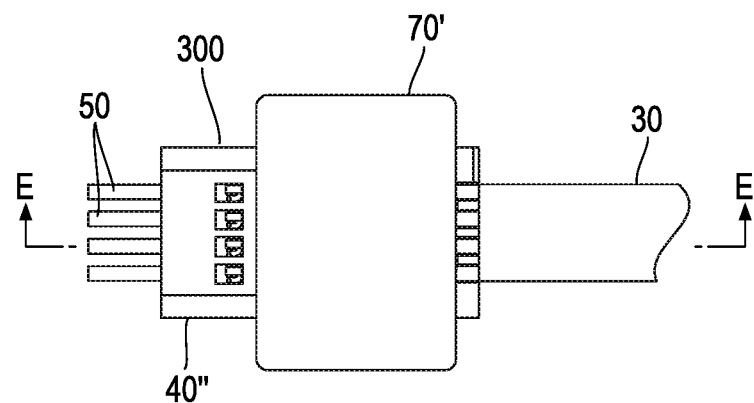
FIG. 15A is a plan view of a connector according to a third embodiment, to which a ceramic element is connected.
Figure 15B:
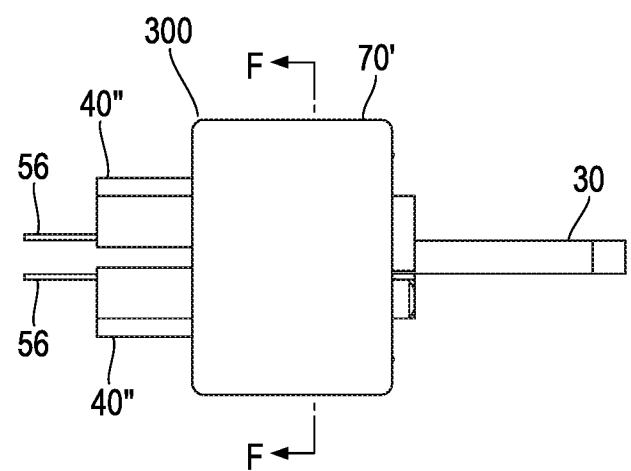
FIG. 15B is a front view of the connector according to the third embodiment, to which the ceramic element is connected.
Figure 15C:
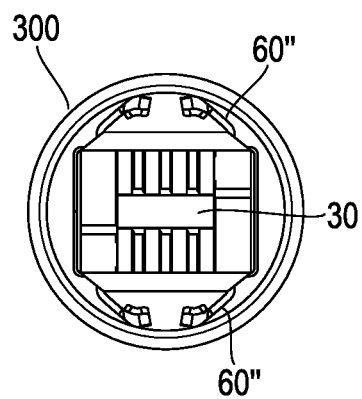
FIG. 15C is a right side view of the connector according to the third embodiment, to which the ceramic element is connected.
Figure 15D:
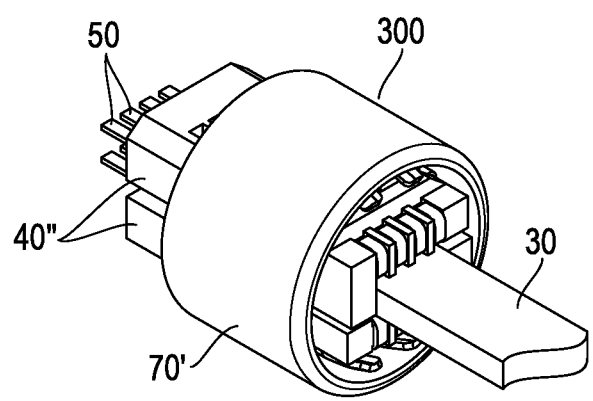
FIG. 15D is a perspective view of the connector according to the third embodiment, to which the ceramic element is connected.

FIGS. 11A and 11B illustrate a connector 200, to which a ceramic element 30 is connected. FIG. 12 is a partial exploded view of the connector 200. FIGS. 13A and 13B illustrate details of an insulator 40'. FIGS. 14A and 14B illustrate the connector 200, to which the ceramic element 30 is not connected. Same constituent elements as those of the connector 100 are denoted by same reference characters, and a detailed description thereof will be omitted.

The connector 200 is the same as the connector 100 except for shapes of two spring components 60' and shapes of two insulators 40'.

The spring component 60' has a square flat plate portion 61, two turnback pieces 64, and two mounting pieces 65, as illustrated in FIGS. 12, 14A, and 14B. The two turnback pieces 64 are continuous with two ends of the flat plate portion 61 in a traveling direction of a sleeve 70 which travels toward the spring component 60' and extend toward a center of the flat plate portion 61 like folding wings, and distal ends 64a of the two turnback pieces 64 face each other. The two turnback pieces 64 function as spring portions (spring pieces). The distal end 64a of the turnback piece 64 is slightly bent inward (that is, toward a side with the flat plate portion 61).

The two mounting pieces 65 are continuous with two ends of the flat plate portion 61 in a width direction (that is, a direction orthogonal to the traveling direction of the sleeve 70) of the spring component 60' and extend in a normal direction of the flat plate portion 61. The two mounting pieces 65 are located on one side of the flat plate portion 61 while the two turnback pieces 64 are located on the opposite side of the flat plate portion 61. A window 66 is formed in each of the two mounting pieces 65.

The insulator 40' does not have the recessed portions 47 and the projections 48, unlike the insulator 40. A recessed portion 49 is formed in each of side surfaces 40c and 40d of the insulator 40' which are located at two ends in an array direction of four grooves 41, and a claw portion 49a is formed at the recessed portion 49. The insulator 40' is made of ceramic, such as an alumina sintered body.

As illustrated in FIGS. 14A and 14B, the spring component 60' is mounted on the insulator 40' by placing the flat plate portion 61 on an upper surface 40b of the insulator 40' and hooking the windows 66 of the two mounting pieces 65 on the claw portions 49a of the insulator 40'.

Two insulators 40' with the spring components 60' mounted thereon are arranged such that lower surfaces 40a holding contacts 50 face each other, as illustrated in FIGS. 14A and 14B. A base end portion 31 of the ceramic element 30 is inserted between the two insulators 40'. Connection of the connector 200 and the ceramic element 30 is completed by positioning the sleeve 70 at the position illustrated in FIGS. 11A and 11B after the insertion.

In a state in which connection of the connector 200 and the ceramic element 30 is completed, the sleeve 70 hangs over the turnback pieces 64 of the two spring components 60', and elastically deforms the turnback pieces 64 by pushing the distal ends 64a of the turnback pieces 64. As a result, the two insulators 40' located on two surfaces of the base end portion 31 of the ceramic element 30 are pushed by the flat plate portions 61 of the two spring components 60' to tightly hold the base end portion 31 from two sides. That is, the two insulators 40' firmly hold the ceramic element 30. Thus, the contact 50 and a terminal electrode 32 formed on the base end portion 31 are electrically connected to each other.

According to the second embodiment, the insulator 40' can be pushed by a large surface of the flat plate portion 61 of the spring component 60', as in the first embodiment. Additionally, each turnback piece 64 has an inclined surface 64b which gradually becomes farther from the flat plate portion 61 in a direction from a base portion (that is, a site near a boundary between the turnback piece 64 and the flat plate portion 61) of the turnback piece 64 toward the distal end of the turnback piece 64. The inclined surface 64b has a slope descending gently toward the sleeve 70 that travels toward the spring component 60' and does not interfere with movement of the sleeve 70. Additionally, with a force received from the sleeve 70, the turnback piece 64 inclines toward the insulator 40'.

Third Embodiment

A configuration of a connector according to a third embodiment for connection of terminal electrodes of a ceramic element and lead wires will be described.

Figure 16A:
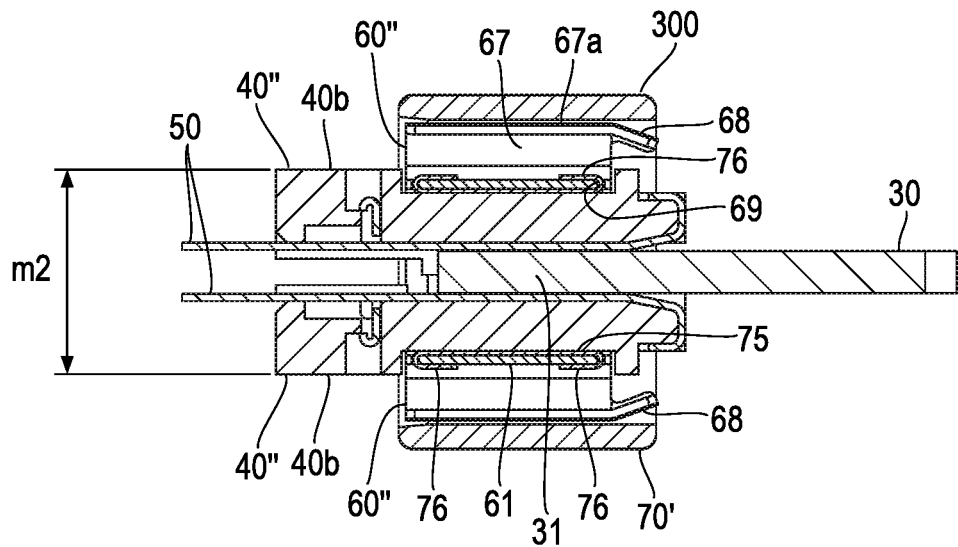
FIG. 16A is an enlarged sectional view taken along line E-E in FIG. 15A.
Figure 16B:
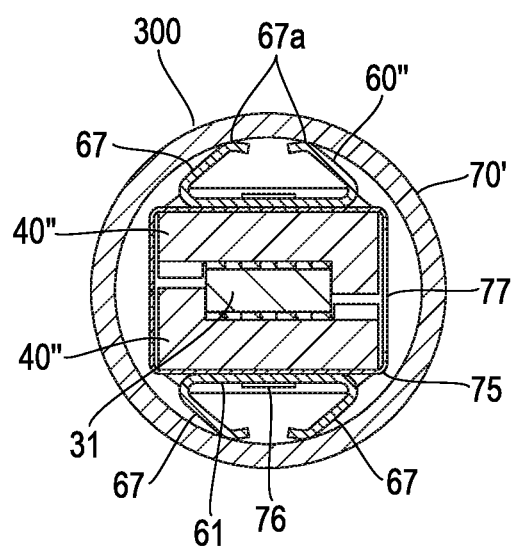
FIG. 16B is an enlarged sectional view taken along line F-F in FIG. 15B.
Figure 17:
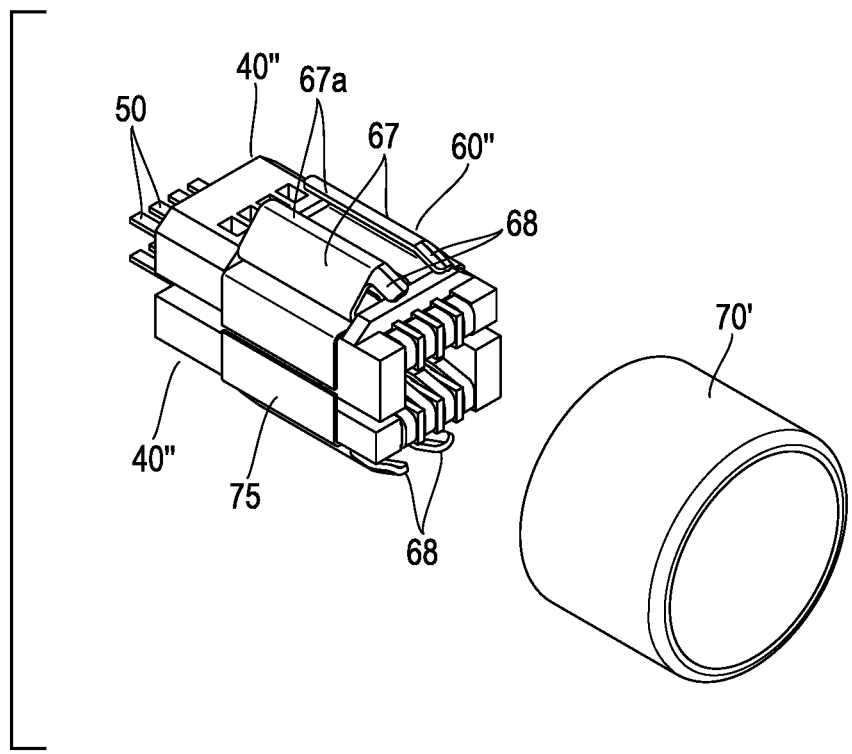
FIG. 17 is a perspective view of the connector according to the third embodiment, which is partially exploded.
Figure 18A:
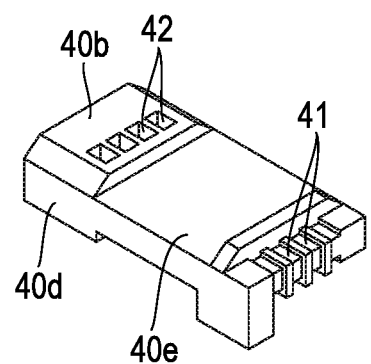
FIG. 18A is a perspective view of an insulator illustrated in FIG. 17.
Figure 18B:
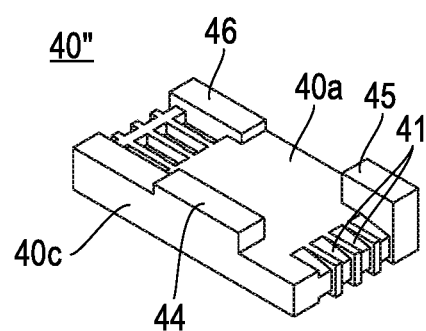
FIG. 18B is an upside-down perspective view of the insulator illustrated in FIG. 18A.
Figure 19A:
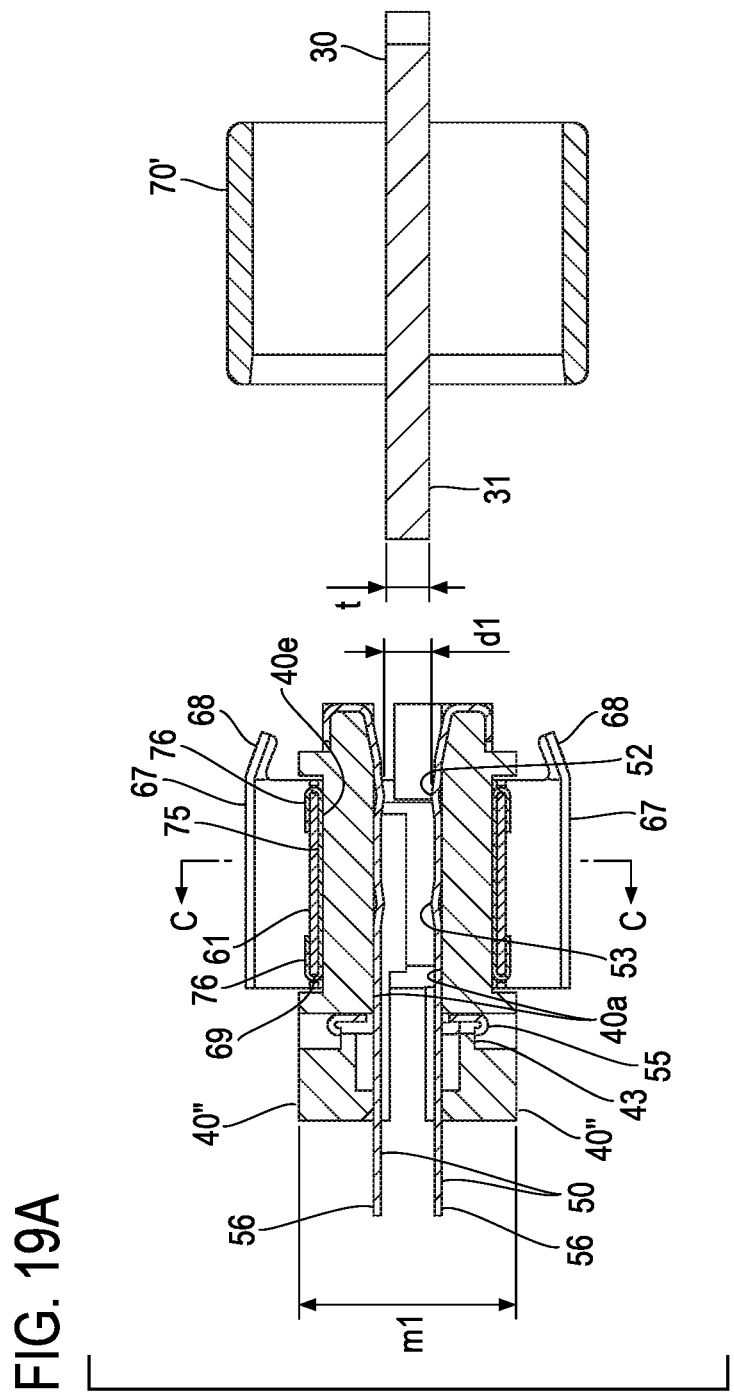
FIG. 19A is a sectional view of the connector according to the third embodiment, to which the ceramic element is not connected.
Figure 19B:
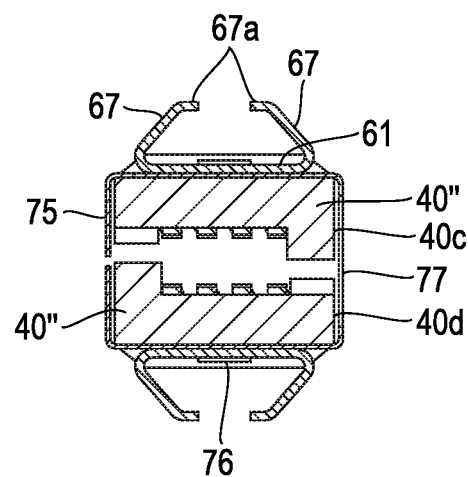
FIG. 19B is a sectional view taken along line C-C in FIG. 19A.

FIGS. 15A, 15B, 15C, 15D, 16A, and 16B illustrate a connector 300 according to the third embodiment, to which a ceramic element 30 is connected. FIG. 17 is a partial exploded view of the connector 300. FIGS. 18A and 18B illustrate details of an insulator 40". FIGS. 19A and 19B illustrate the connector 300, to which the ceramic element 30 is not connected. Same constituent elements as those of the connector 100 are denoted by same reference characters, and a detailed description thereof will be omitted.

The spring component 60" has a square flat plate portion 61 and two turnback pieces 67, as illustrated in FIGS. 17, 19A, and 19B. The two turnback pieces 67 are continuous with two ends of the flat plate portion 61 in a direction perpendicular to a traveling direction of a sleeve 70' which travels toward the spring component 60" and extend toward a center of the flat plate portion 61 like folding wings, and distal ends 67a of the two turnback pieces 67 face each other. The two turnback pieces 67 function as spring portions (spring pieces). The distal end 67a of the turnback piece 67 is bent inward and is almost parallel to the flat plate portion 61.

A projecting portion 68 which projects in the traveling direction of the sleeve 70' that travels toward the spring component 60" is formed at a front end portion (that is, one corner of the distal end 67a) of each of the two turnback pieces 67. Each projecting portion 68 has an inclined surface with a slope descending gently toward the sleeve 70' that travels toward the spring component 60". A slight notch 69 (see FIG. 19A) is formed in a central portion of each of the two ends of the flat plate portion 61 in the traveling direction of the sleeve 70' that travels toward the spring component 60".

The insulator 40" does not have the recessed portions 47 and the projections 48, unlike the insulator 40. A recessed portion 40e which extends from one end to the other end in a width direction (that is, an array direction of four grooves 41) is formed in a middle portion of an upper surface 40b. The insulator 40" is also made of ceramic, such as an alumina sintered body.

The spring component 60" is mounted on the insulator 40" using a metal fitting 75. The metal fitting 75 is formed by bending a metal plate and has a section in a hollow square shape. The metal fitting 75 is located in the recessed portions 40e of the two insulators 40" and holds the two insulators 40" from two sides.

Two fixing pieces 76 project from two ends of a portion of the metal fitting 75, which is located in the recessed portion 40e of the insulator 40", in the traveling direction of the sleeve 70' that travels toward the spring component 60". A position of the fixing piece 76 corresponds to a position of the notch 69 formed in the flat plate portion 61 of the spring component 60". As illustrated in FIG. 16A, the flat plate portion 61 is fixed by bending the fixing pieces 76 after passage through the notches 69. As a result, the spring component 60" is mounted on the metal fitting 75.

The metal fitting 75 and the two spring components 60" are mounted on the two insulators 40" holding contacts 50. A base end portion 31 of the ceramic element 30 is inserted between the two insulators 40" in the state illustrated in FIGS. 19A and 19B. Connection of the connector 300 and the ceramic element 30 is completed by positioning the circular cylindrical sleeve 70' at the position illustrated in FIGS. 15A, 15B, 15C, 15D, 16A, and 16B after the insertion.

In a state in which connection of the connector 300 and the ceramic element 30 is completed, the sleeve 70' hangs over the turnback pieces 67 of the two spring components 60", and elastically deforms the turnback pieces 67 by pushing the distal ends 67a of the turnback pieces 67. As a result, the two insulators 40" located on two surfaces of the base end portion 31 of the ceramic element 30 are pushed by the flat plate portions 61 of the two spring components 60" along with the metal fitting 75 between the two insulators 40" and the flat plate portions 61 to tightly hold the base end portion 31 from two sides. That is, the two insulators 40" firmly hold the ceramic element 30. Thus, the contact 50 and a terminal electrode 32 formed on the base end portion 31 are electrically connected to each other.

According to the third embodiment, the projecting portion 68 has a slope descending gently toward the sleeve 70' that travels toward the spring component 60" and does not interfere with movement of the sleeve 70'. Additionally, with a force received from the sleeve 70', the turnback piece 67 inclines toward the insulator 40".

A large opening 77 is formed in a portion of the metal fitting 75 which faces one of combinations, each having side surfaces 40c and 40d, of the two insulators 40". Thus, when the metal fitting 75 is pushed by the spring components 60", the opening 77 is deformed to cause portions of the metal fitting 75 which are located in the recessed portions 40e of the two insulators 40" to follow the recessed portions 40e well.

The connectors 200 and 300 according to the second and third embodiments can also be used to connect the ceramic element 30 and the lead wires 96 in a ceramic applied electronic device and can be electrically connected to the ceramic element 30 with good workability and excellent reliability.

Shapes of the sleeves 70 and 70' are each, for example, a circular cylindrical shape or a cylindrical shape which is hollow and polygonal in sectional shape.

Addendum

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims.

Moreover, the use of the terms "first", "second", "i-th", etc., if any, do not denote any order or importance, but rather the terms "first", "second", "i-th", etc. are used to distinguish one element from another. The term "first" does not necessarily mean "coming before all others in order". The terminology used herein is for the purpose of describing particular embodiments only and is not intended to limit the invention in any way. As used herein, the singular forms "a", "an" and "the" are intended to include the plural forms as well, unless the context clearly indicates otherwise. It will be further understood that the terms "comprise", "comprises", and/or "comprising," when used in this specification and/or the appended claims, specify the presence of stated features, steps, operations, elements, and/or components, but do not preclude the presence or addition of one or more other features, steps, operations, elements, components, and/or groups thereof. The same goes for "include", "includes", and/or "including". The term "and/or", if any, includes any and all combinations of one or more of the associated listed items. In the claims and the specification, unless otherwise noted, "connect", "join", "couple", "interlock", or synonyms therefor and all the word forms thereof, if any, do not necessarily deny the presence of one or more intermediate elements between two elements, for instance, two elements "connected" or "joined" to each other or "interlocked" with each other. Connection between elements, if required, may be physical connection, electrical connection, or a combination thereof.

Unless otherwise defined, all terms (including technical and scientific terms) used herein have the same meaning as commonly understood by those skilled in the art to which the invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual techniques or steps in an unnecessary fashion. Nevertheless, the specification and claims should be read with the understanding that such combinations are entirely within the scope of the invention and the claims.

The corresponding structures, materials, acts, and equivalents of all means or step plus function elements in the claims below, if any, are intended to include any structure, material, or act for performing the function in combination with other claimed elements as specifically claimed.

The foregoing description of the embodiments of the invention has been presented for the purpose of illustration and description. It is not intended to be exhaustive and to limit the invention to the precise form disclosed. Modifications or variations are possible in light of the above teaching. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A ceramic applied electronic device comprising:
   a ceramic element including a base end portion;
   terminal electrodes on the base end portion of the ceramic element;
   lead wires for connection with an external apparatus, the lead wires being led out from the ceramic applied electronic device,
   two insulators, each holding contacts that are connected to the lead wires and being arranged on both surfaces of the base end portion of the ceramic element;
   two spring components, each being located on an outer surface of a corresponding one of the two insulators and each including a flat plate portion extending in parallel to the outer surface and a spring portion supported by the flat plate portion; and
   a cylindrical sleeve, wherein
   the spring portion of each of the two spring components includes an inclined surface configured to receive, from the cylindrical sleeve that moves toward the two spring components along a longitudinal direction of the ceramic element, a force toward the two insulators,
   an attachment of the cylindrical sleeve to the two spring components is achieved through the movement of the cylindrical sleeve along the longitudinal direction of the ceramic element,
   the spring portion of each of the two spring components is elastically deformed by the attachment of the cylindrical sleeve to the two spring components,
   the two insulators hold the base end portion of the ceramic element from both sides by being pushed by the flat plate portions of the two spring components in directions in which the two insulators are brought closer to each other, and
   the contacts are pushed against the terminal electrodes.

2. The ceramic applied electronic device according to claim 1, wherein
   the spring portion comprises two turnback pieces which are continuous with two ends of the flat plate portion in the movement direction, and
   distal ends of the two turnback pieces face each other.

3. The ceramic applied electronic device according to claim 1, wherein
   the spring portion comprises two turnback pieces which are continuous with two ends of the flat plate portion in a direction perpendicular to the movement direction,
   distal ends of the two turnback pieces face each other, and
   a projecting portion which has an inclined surface inclining in the movement direction protrudes from a front end portion of each of the two turnback pieces.

4. The ceramic applied electronic device according to claim 1, wherein
   the base end portion of the ceramic element is inserted between the two insulators from a first end of the two insulators in the longitudinal direction of the ceramic element, and
   the inclined surface of the spring portion inclines such that the distance between the flat plate portion and the inclined surface of the spring portion increases as the inclined surface extends farther from the first end of the two insulators in the longitudinal direction of the ceramic element.

5. The ceramic applied electronic device according to claim 1, wherein the inclined surface of the spring portion extends to intersect the longitudinal direction of the ceramic element.

6. The ceramic applied electronic device according to claim 1, wherein
   the spring portion comprises a turnback piece which is continuous with one end of the flat plate portion and extends from the one end of the flat plate portion to the other end of the flat plate portion.

7. The ceramic applied electronic device according to claim 6, wherein
   the turnback piece has a bent portion,
   the turnback piece has a V-shape in which the bent portion is farther from the flat plate portion, and
   a distal end of the turnback piece is pushed against the other end of the flat plate portion.

8. A connector for electrically connecting terminal electrodes on a base end portion of a ceramic element to lead wires, the connector comprising:
   two insulators, each holding contacts that are connected to the lead wires;
   two spring components, each being located on an outer surface of a corresponding one of the two insulators and each including a flat plate portion extending in parallel to the outer surface and a spring portion supported by the flat plate portion; and
   a cylindrical sleeve, wherein
   the spring portion of each of the two spring components includes an inclined surface configured to receive, from the cylindrical sleeve that moves toward the two spring components along a longitudinal direction of the ceramic element, a force toward the two insulators,
   an attachment of the cylindrical sleeve to the two spring components is achieved through the movement of the cylindrical sleeve along the longitudinal direction of the ceramic element,
   the spring portion of each of the two spring components is configured to be elastically deformed by the attachment of the cylindrical sleeve to the two spring components, and
   the two insulators are configured to hold the base end portion of the ceramic element from both sides and push the contacts against the terminal electrodes by being pushed by the flat plate portions of the two spring components in directions in which the two insulators are brought closer to each other after the attachment of the cylindrical sleeve to the spring components.

9. The connector according to claim 8, wherein
the spring portion comprises two turnback pieces which are continuous with two ends of the flat plate portion in the movement direction, and
distal ends of the two turnback pieces face each other.

10. The connector according to claim 8, wherein
the spring portion comprises two turnback pieces which are continuous with two ends of the flat plate portion in a direction perpendicular to the movement direction,
distal ends of the two turnback pieces face each other, and
a projecting portion which has an inclined surface inclining in the movement direction protrudes from a front end portion of each of the two turnback pieces.

11. The connector according to claim 8, wherein
the base end portion of the ceramic element is inserted between the two insulators from a first end of the two insulators in the longitudinal direction of the ceramic element, and
the inclined surface of the spring portion inclines such that the distance between the flat plate portion and the inclined surface of the spring portion increases as the inclined surface extends farther from the first end of the two insulators in the longitudinal direction of the ceramic element.

12. The connector according to claim 8, wherein the inclined surface of the spring portion extends to intersect the longitudinal direction of the ceramic element.

13. The connector according to claim 8, wherein
the spring portion comprises a turnback piece which is continuous with one end of the flat plate portion and extends from the one end of the flat plate portion to the other end of the flat plate portion.

14. The connector according to claim 13, wherein
the turnback piece has a bent portion,
the turnback piece has a V-shape in which the bent portion is farther from the flat plate portion, and
a distal end of the turnback piece comes into contact with the other end of the flat plate portion in a state in which the sleeve hangs over the spring portion.

* * * * *

UNITED STATES PATENT AND TRADEMARK OFFICE
CERTIFICATE OF CORRECTION

PATENT NO. : 11,585,782 B2
APPLICATION NO. : 17/010227
DATED : February 21, 2023
INVENTOR(S) : Osamu Hashiguchi It is certified that error appears in the above-identified patent and that said Letters Patent is hereby corrected as shown below:

In the Claims

At Column 13, Line 28 (Claim 1, Line 7), please change "electronic device," to -- electronic device; --.

Signed and Sealed this
Sixteenth Day of May, 2023

Katherine Kelly Vidal
*Director of the United States Patent and Trademark Office*